(12) United States Patent
Llorente Gil et al.

(10) Patent No.: US 11,317,478 B2
(45) Date of Patent: Apr. 26, 2022

(54) PAD DEVICE

(71) Applicant: BSH Hausgeräte GmbH, Munich (DE)

(72) Inventors: Sergio Llorente Gil, Saragossa (ES);
Jorge Mir Bel, Saragossa (ES); Julio Rivera Peman, Cuarte de Huerva (ES)

(73) Assignee: BSH Hausgeräte GmbH, Munich (DE)

( * ) Notice: Subject to any disclaimer, the term of this patent is extended or adjusted under 35 U.S.C. 154(b) by 1008 days.

(21) Appl. No.: 15/778,654

(22) PCT Filed: Nov. 24, 2016

(86) PCT No.: PCT/IB2016/057099
§ 371 (c)(1),
(2) Date: May 24, 2018

(87) PCT Pub. No.: WO2017/103712
PCT Pub. Date: Jun. 22, 2017

(65) Prior Publication Data
US 2018/0352613 A1 Dec. 6, 2018

(30) Foreign Application Priority Data
Dec. 17, 2015 (ES) ................. ES201531830

(51) Int. Cl.
*H05B 6/06* (2006.01)
*A47J 36/34* (2006.01)
*A47J 36/32* (2006.01)

(52) U.S. Cl.
CPC .............. *H05B 6/062* (2013.01); *A47J 36/32* (2013.01); *A47J 36/34* (2013.01); *H05B 2213/06* (2013.01); *H05B 2213/07* (2013.01)

(58) Field of Classification Search
CPC ........ A47J 36/32; A47J 36/34; H05B 2213/06; H05B 2213/07; H05B 6/062
USPC .......................................... 219/626
See application file for complete search history.

(56) References Cited

U.S. PATENT DOCUMENTS

| 3,742,179 A | 6/1973 | Hamden et al. |
| 5,723,746 A | 3/1998 | Bestwick et al. |
| 6,080,975 A | 6/2000 | Kuse et al. |
| 9,095,005 B2 * | 7/2015 | Reischmann ........ H05B 6/1209 |
| 2009/0194526 A1 * | 8/2009 | Buchanan ............. H05B 6/062 219/600 |
| 2009/0289054 A1 | 11/2009 | Williams et al. |
| 2012/0024835 A1 | 2/2012 | Artal Lahoz et al. |

(Continued)

FOREIGN PATENT DOCUMENTS

| DE | 3327622 A1 | 2/1985 |
| JP | S63269488 A | 11/1988 |

OTHER PUBLICATIONS

International Search Report PCT/IB2016/057099 dated Feb. 3, 2017.
National Search Report ES 201531830 dated Oct. 25, 2016.

*Primary Examiner* — Dana Ross
*Assistant Examiner* — James F Sims, III
(74) *Attorney, Agent, or Firm* — Michael E. Tschupp; Andre Pallapies; Brandon G. Braun

(57) ABSTRACT

A pad device includes a pad unit for placement at least in part between a setting-down counter and a heated cooking vessel in a heating operating mode. To provide great flexibility, the pad device includes an electronic unit which supplies at least one function in at least one operating mode.

22 Claims, 2 Drawing Sheets

(56) References Cited

U.S. PATENT DOCUMENTS

| | | | | |
|---|---|---|---|---|
| 2012/0145865 A1* | 6/2012 | Wong | ............ | A47J 36/34 |
| | | | | 248/346.11 |
| 2015/0049785 A1 | 2/2015 | Burkhardt et al. | | |
| 2015/0118630 A1* | 4/2015 | Ewell | ............ | A47J 27/21083 |
| | | | | 432/1 |
| 2015/0257576 A1* | 9/2015 | Yorukoglu | ............ | A47J 36/00 |
| | | | | 99/331 |

* cited by examiner

PAD DEVICE

CROSS-REFERENCES TO RELATED APPLICATIONS

This application is the U.S. National Stage of International Application No. PCT/IB2016/057099, filed Nov. 24, 2016, which designated the United States and has been published as International Publication No. WO 2017/103712 A1 and which claims the priority of Spanish Patent Application, Serial No. P201531830, filed Dec. 17, 2015, pursuant to 35 U.S.C. 119(a)-(d).

BACKGROUND OF THE INVENTION

The invention relates to a pad device according to the preamble of claim 1.

A pad device is already known from WO 2009/143199 A1 which is provided for putting down on a setting-down counter. The setting-down counter forms part of a stovetop and is realized in the form of a stovetop plate. A pad unit of the pad device is arranged between the setting-down counter and a heated cooking vessel in a heating operating mode. An electronic unit is integrated in the stovetop and realized so as to form one piece with a stovetop control unit of the stovetop.

BRIEF SUMMARY OF THE INVENTION

The object of the invention consists in particular in making available a generic device having improved properties in respect of great flexibility.

The invention is based on a pad device comprising at least one pad unit that is provided in order to be placed at least in part between a setting-down counter and a heated cooking vessel in at least one heating operating mode.

It is proposed that the pad device has an electronic unit which is provided in order to supply at least one function in at least one operating mode, in particular at least in the heating operating mode. A "pad device" should be understood to mean in particular a device which is provided in particular for putting down, in particular for placing, on the setting-down counter and for setting down at least one cooking vessel, and which realizes at least in part a pad for the heated cooking vessel in particular in the heating operating mode. In an installation position the pad device is provided in particular for placing above a stovetop. In particular the pad device forms part of a cooking system. The cooking system has in particular the stovetop. A "stovetop" should be understood to mean in particular a unit which has at least a heating unit and a supply unit and a stovetop control unit, which is provided in particular in order to activate the supply unit in particular to supply the heating unit with energy, in particular with electrical energy, wherein the heating unit is provided in particular to make available energy, in particular electromagnetic energy, to at least one cooking vessel, in particular to the cooking vessel, depending on being supplied by the supply unit, in the heating operating mode. For example the stovetop could have at least one stovetop plate. Alternatively the stovetop could be free of any stovetop plate. In particular the pad device is realized in the form of a separate unit with the result that in particular a high level of flexibility can be achieved. In particular a pad unit of the pad device realized in the form of a separate unit can be positioned at any required position on the setting-down counter. The pad device is in particular different from the stovetop and advantageously moveable relative to the stovetop. In particular the pad device is provided for use with the stovetop and preferably with various stovetops. The stovetop is provided in particular for use with at least one pad device and advantageously at least in essence simultaneously with at least two, advantageously with at least three, and preferably with at least four pad devices. In this context a "heating unit" should be understood to mean in particular a unit which is provided in order to convert energy, preferably electrical energy, into heat and in particular to feed it to at least one cooking vessel. Advantageously the heating unit is realized in the form of an induction heating unit. In particular the pad unit forms at least in essence the pad for the heated cooking vessel. The pad unit has in particular at least in essence a plate-shaped form. In particular the pad unit has a thickness which is aligned in particular perpendicular to a main plane of extension of the pad unit and in particular has value of at most 10%, in particular at most 7%, advantageously at most 5%, particularly advantageously at most 3%, preferably at most 2%, and particularly preferably at most 1.2% of a maximal extension of the pad unit aligned at least in essence parallel to the main plane of extension of the pad unit. A "main plane of extension" of an object should be understood to mean in particular a plane which is parallel to a largest side surface of a smallest notional geometric cuboid which just completely encloses the object, and runs in particular through the center point of the cuboid. For example at least the pad unit, and in particular additionally at least one spacer element and/or one handle unit, could be realized in the form of a mat. The thickness of the pad unit, advantageously of the pad device, is aligned in particular at least in essence perpendicular to the setting-down counter in the heating operating mode. For example the pad unit could have at least in essence an n-cornered, such as for example a square and/or rectangular and/or oval, such as for example an ellipse-shaped, form. Advantageously the pad unit has at least in essence a circular and/or disk-shaped form. In particular the pad unit has a diameter in a range from 120 mm to 320 mm, in particular from 140 mm to 280 mm, advantageously from 160 mm to 240 mm, and preferably from 180 mm to 210 mm. In particular the pad unit has a thickness in a range of 0.5 mm to 3.5 mm, in particular from 1 mm to 3 mm, advantageously from 1.5 mm to 2.5 mm, and preferably from 1.75 mm to 2.25 mm. In particular the pad unit could have at least one recess and advantageously at least one cavity which could be provided in particular for accommodating at least part of the electronic unit. The pad unit is provided in particular in order to space apart from each other, in particular physically, the setting-down counter and the heated cooking vessel in the heating operating mode. In particular the pad unit is provided in order to establish at least in essence a connection between the heated cooking vessel and the setting-down counter, and/or at least to contribute to a connection between the heated cooking vessel and the setting-down counter, in the operating mode. The pad unit is provided in particular for setting down various cooking vessels. For example the pad unit could be provided for setting down cooking vessels of various sizes and/or various diameters. The pad unit could be provided in particular for setting down cooking vessels with a diameter which in particular is greater than a diameter of the pad unit. The operating mode could be arranged in particular to occur before the heating operating mode and/or overlap at least in part with the heating operating mode. A "heating operating mode" should be understood to mean in particular a mode in which in particular a heating of the cooking vessel takes place. In particular a stovetop arranged below the setting-down counter makes a heating energy available in the heating operating mode. The stovetop has in particular at least one heating unit which is provided in particular in order to make the heating energy available. The stovetop has in particular a stovetop control unit which is provided in particular in order to control and/or regulate an energy feed to the heating unit in the heating operating mode. In particular at least the pad unit is put down on the setting-down counter in the heating operating mode. A "setting-down counter" should be understood to mean in particular a unit which is provided for setting down cooking vessels and/or putting down the pad unit in at least one operating mode, in particular at least in the heating operating mode. For example the setting-down counter could be a countertop, in particular a kitchen countertop, and/or a stovetop plate. A "stovetop plate" should be understood to mean in particular a unit which is provided for setting down cooking vessels in at least one operating mode, and which is provided in particular in order to realize part of an outer casing, in particular of the stovetop. The stovetop plate consists in particular at least to a large degree of glass and/or glass ceramic. "At least to a large degree" should be understood to mean in particular a proportion of at least 70%, in particular at least 80%, advantageously at least 90%, and preferably at least 95%. A "countertop" should be understood to mean in particular a unit on which in particular preparation and/or processing of foodstuffs occurs and/or which is provided in particular for storing and/or setting-down at least one work utensil, in particular one kitchen utensil. For example the work utensil could be a cooking vessel and/or a baking mold and/or a dish and/or a kitchen appliance and/or a knife and/or a spoon and/or a fork and/or a kitchen vessel and/or a baking vessel and/or a preparation board and/or a kitchen work board, such as for example a chopping board. The setting-down counter could consist in particular at least to a large degree of laminated plastic and/or laminate and/or natural stone and/or synthetic stone and/or mineral material and/or solid wood and/or real wood and/or ceramic and/or cement and/or glass. An "electronic unit" should be understood to mean in particular a unit which has at least one electrical and/or electronic component and/or which has at least one electrical and/or electronic unit. For example the electrical and/or electronic component could be an electrical resistance component and/or a transmitter and/or a sensor and/or a receiver and/or a coil and/or a diode and/or a capacitor. The electrical and/or electronic unit could for example be an operating unit and/or a control unit and/or a communications unit. "Provided" should be understood to mean in particular specifically programmed, designed and/or fitted out. An object being provided for a certain function should be understood to mean in particular that the object fulfills and/or executes this certain function in at least one application mode and/or operating mode.

The inventive embodiment makes it possible in particular to achieve a high level of flexibility. It is possible in particular to enable an independence of the pad device from a stovetop control unit. A high level of convenience for a user can be made available in particular. In the case of a setting-down counter realized in the form of a countertop an easy cleanability can be obtained in particular.

For example the pad unit could consist of at least one magnetic, in particular of at least one ferromagnetic, material and be provided in particular in order to enable a heating of an induction-incompatible and/or non-magnetic, in particular non-ferromagnetic, cooking vessel by using a heating unit of the stovetop which is realized in the form of an induction heating unit. Preferably the pad unit is provided in order to prevent at least in essence a transfer of heat from the cooking vessel to the setting-down counter in the heating operating mode. In particular the pad unit is provided in order to make at least a thermal insulation and/or a thermal sink available in the heating operating mode. The pad unit has in particular a thermally insulating material and/or a material with a relatively high specific thermal capacity, and consists preferably at least to a large degree of that material. For example the pad unit could consist at least to a large degree of rubber and/or of silicone. Advantageously the pad unit consists at least to a large degree of a material with a specific thermal capacity of at least 800 J/(kg*K), in particular of at least 1000 J/(kg*K), advantageously of at least 1200 J/(kg*K), particularly advantageously of at least 1400 J/(kg*K), preferably of at least 1500 J/(kg*K), and preferably of at least 1600 J/(kg*K). Alternatively or additionally the pad unit consists at least to a large degree of a material with a thermal conductivity of at most 1 W/(m*K), in particular of at most of 0.8 W/(m*K), advantageously of at most 0.5 W/(m*K), particularly advantageously of at most 0.3 W/(m*K), preferably of at most 0.2 W/(m*K), and preferably of at most 0.16 W/(m*K). This results in it being possible in particular to prevent damage to the setting-down counter, in particular to a surface of the setting-down counter, caused in particular by high temperature gradients, and/or to obtain a durable embodiment with the result that the setting-down counter can consist in particular at least to a large degree of at least one high-quality material. In particular a high level of operating safety can be made available and/or a heating of the pad device prevented.

It is additionally proposed that the pad unit consists at least to a large degree of an essentially flexible and/or elastic material. The material could for example be rubber and/or silicone. This results in it being possible in particular to obtain an optimal adaptation to a shape of the heated cooking vessel and/or to a shape of the setting-down counter. In particular a high level of convenience for a user can be achieved and/or damage to the setting-down counter prevented. In particular it is possible to achieve, in particular, a low level of risk of damage to the pad device, for example in the event of falling on to a substrate.

For example the stovetop control unit could be provided for detection of a position of the pad unit on the setting-down counter. Alternatively or additionally the cooking system, which in particular could have the pad device and the stovetop, could have at least one system positioning unit which could be provided in particular in order to detect at least in essence a position of the pad unit on the setting-down counter. The system positioning unit could have in particular at least one image-taking unit, such as a camera for example, and be arranged for example in an extractor unit. Preferably the electronic unit has at least one positioning unit which is provided in order to detect at least in essence at least one position of the pad unit on the setting-down counter. The positioning unit could for example have at least one acceleration sensor which could be provided for detecting the position of the pad unit on the setting-down counter. In particular the acceleration sensor could be calibrated, for example at the factory and/or during an initial use by a user and/or prior to every use by a user and/or prior to an implementation of the heating operating mode. In particular the acceleration sensor could be provided in order to be moved, starting from a certain, in particular predefined, first position to a certain, in particular predefined, second position for the purpose of the calibration. The positioning unit could be provided in particular in order to store the calibration of the acceleration sensor and in particular to determine a position of the acceleration sensor on the basis of the calibration of the acceleration sensor. In particular the positioning unit could have a storage unit in which the positioning unit could store in particular the calibration of the acceleration sensor. In particular at least one position of the heating unit of the stovetop could be stored in the storage unit of the positioning unit. Alternatively or additionally the positioning unit could have at least one RFID transponder which could be provided in particular in order to detect at least in essence the position of the pad unit on the setting-down counter. The positioning unit could be provided alternatively or additionally in order to detect at least in essence the position of the pad unit on the setting-down counter by using triangulation. The electronic unit could have in particular an output unit which could be provided in particular for an acoustic and/or optical and/or haptic output of at least one signal, in particular a warning signal. The output unit could have in particular at least one illuminating means, such as for example an LED, which could be provided in particular for outputting the signal, in particular the warning signal. In particular the output unit could be provided in order to output the warning signal in the event of incorrect positioning of the pad unit, in particular in the case of a positioning of the pad unit outside a zone provided for the purpose. The output unit could be in particular a dynamic output unit and be provided in particular in order to output the warning signal in particular by using at least one sound and/or by using at least one light signal. Alternatively or additionally the output unit could be in particular a static output unit and be provided in particular in order to mark a zone provided for positioning of the pad unit by using a marking that is in particular inserted in the setting-down counter. Advantageously the pad unit is provided for a positioning at any required point on the setting-down counter above the stovetop.

For example the electronic unit could have at least one storage unit in which in particular a size and/or dimension of a cooking area could be stored. In particular the positioning unit could be calibrated to the cooking area. The electronic unit could be provided in particular in order to output at least one positioning aid in particular by using the display unit, in particular to ensure a positioning of at least the pad unit on the cooking area. This makes it possible in particular to omit a stovetop positioning unit.

It is furthermore proposed that the electronic unit has at least one temperature sensor which is provided in order to detect at least one temperature of the cooking vessel in the heating operating mode. In particular the electronic unit is provided in order to supply a detection of a temperature of the cooking vessel in the heating operating mode. A "sensor" should be understood to mean in particular at least one element which has at least one detector for detection of at least one sensor parameter and which is provided in order to output a value identifying the sensor parameter, wherein the sensor parameter advantageously involves a physical and/or chemical variable. For example the temperature sensor could be provided in order to change its resistance depending on a temperature. Alternatively or additionally the temperature sensor could be provided in order to change at least one electrical property, such as in particular a voltage and/or a current conductivity, depending on a temperature. The temperature sensor for example could be a contact sensor and/or an infrared sensor and/or a resistance sensor, such as for example an NTC resistor and/or a PTC resistor. In particular the temperature sensor is arranged at least to a large degree in the pad unit. The pad unit has in particular at least one detection window which is provided in particular in order to enable a detection of a temperature by the temperature sensor. In particular the temperature sensor is arranged at least to a large degree below the detection window of the pad unit and/or at least in a zone near to the detection window of the pad unit. Alternatively or additionally the pad device could have in particular at least one waveguide which could be provided in particular in order to direct infrared radiation from the detection window to the temperature sensor, which could be arranged in particular spaced away from the detection window. The detection window could be in particular at least to a large degree permeable to thermal radiation and/or to infrared radiation. Alternatively or additionally the detection window could have in particular a higher thermal conductivity than remaining zones of the pad unit and could be provided in particular for conduction of heat, in particular of heat emanating from the cooking vessel, to the temperature sensor. This makes it possible in particular to obtain a high level of convenience for a user and/or a high level of information. In particular it is possible to create the option of implementation of an automatic cooking process. A smaller distance from a temperature sensor to the cooking vessel makes it possible in particular to enable an optimal detection of the temperature of the cooking vessel.

Additionally it is proposed that the electronic unit has at least one operating unit which is provided for an operating input of at least one operating parameter. In particular the electronic unit is provided in order to supply an input function for at least one operating parameter in the operating mode. An "operating unit" should be understood to mean in particular an electrical and/or electronic unit which is provided in particular for receiving an operating signal and in particular for processing the operating signal. In particular the operating unit is provided in order, during the processing of the operating signal, at least to identify the operating signal and/or forward the operating signal to a control unit. The operating unit is provided in particular for an input of operating parameters and/or for a selection of operating parameters. The operating parameter for example could be a heating power and/or a heating power density and/or a heating power level and/or a heating zone. For example the operating unit could be provided for outputting a value of an operating parameter to a user. This makes it possible in particular to omit a stovetop operating unit and/or achieve a convenient embodiment. If the operating unit is provided in particular for outputting a value of an operating parameter to a user, it is possible in particular to omit a stovetop output unit, in particular amplifiers and/or sound output elements.

For example the operating unit could be provided in order, during the processing of the operating signal, at least to identify the operating signal and in particular at least to initiate an action for realization of the operating signal. Advantageously the operating unit is provided in order, in particular for the realization of the operating signal, to forward the operating signal to a control unit of the electronic unit. Preferably the electronic unit has a control unit which is provided in order to control and/or regulate at least one cooking process in the heating operating mode depending on the operating input. The electronic unit has in particular at least one communications unit which is provided in particular for communication with the stovetop control unit. In particular the electronic unit is provided in order to activate the stovetop control unit by using the control unit and in particular to initiate an activation of the heating unit. The stovetop control unit is provided in particular in order to activate the supply unit, depending on activation by the control unit of the electronic unit, which supply unit is provided in particular for supplying the heating unit with energy, in particular electrical energy, in particular to bring about the cooking process. A "cooking process" should be understood to mean in particular a process in which in particular the heating unit feeds energy, advantageously in the form of electromagnetic energy, to the cooking vessel set down on the pad unit. The cooking process takes place in particular in the heating operating mode. For example the cooking process could comprise roasting and/or boiling and/or steaming over liquid and/or steaming with a small amount of liquid or fat and/or simmering and/or pressure cooking and/or low-temperature cooking and/or vacuum cooking and/or sautéing and/or broiling and/or deep-frying and/or braising and/or poaching and/or baking. A "control unit" should be understood to mean in particular an electronic unit which has a computing unit and in particular additionally to the computing unit a storage unit with an operating program stored in it which is provided in order to be executed by the computing unit. A "stovetop control unit" should be understood to mean in particular an electronic unit which preferably is integrated at least in part in a control and/or regulating unit of the stovetop and which preferably is provided in order to control and/or regulate the supply unit, which is provided in particular for supplying the heating unit. This makes it possible for the control unit in particular to take over at least to a large degree tasks of the stovetop control unit, with the result that in particular enhanced operating capabilities can be achieved.

It is furthermore proposed that the pad device has at least one spacer element which is provided in order to space the operating unit away from the pad unit. The spacer element is realized in particular, when viewed from above, at least in essence in rod-shaped form. In particular the spacer element has a longitudinal extension of at least 100 mm, in particular at least 120 mm, advantageously at least 140 mm, and preferably at least 150 mm. In particular the spacer element has a thickness in a range from 0.5 mm to 3.5 mm, in particular from 1 mm to 3 mm, advantageously from 1.5 mm to 2.5 mm, and preferably from 1.75 mm to 2.25 mm. In particular the pad unit is arranged at a first side of the spacer element. The operating unit is in particular arranged at a second side of the spacer element. The spacer element is provided in particular in order to space the operating unit away from the pad unit by a distance of at least 50 mm, in particular at least 80 mm, advantageously at least 100 mm, particularly advantageously at least 130 mm, and preferably at least 150 mm. In particular the spacer element and the pad unit are preferably connected together in a single piece. The spacer element and the pad unit have a first contact point. The spacer element has in particular a longitudinal extension which is aligned in particular at least in essence perpendicular to a tangent to the first contact point. In particular the spacer element is provided in order to supply a thermal insulation, in particular additionally to a thermal insulation supplied by the pad unit. This makes it possible in particular to achieve a high level of convenience for a user and/or a high level of operating safety. In particular an operating input can be performed unhindered by using the operating unit at any time, in particular also during the heating operating mode. In particular a user can be protected optimally against burns. In particular a high level of thermal insulation can be supplied.

It is additionally proposed that the pad device has a handle unit which is connected to the pad unit. For example the handle unit could be arranged at the side of the pad unit. Advantageously the handle unit is arranged spaced away from the pad unit and in particular connected to the pad unit by using the spacer element. In particular the handle unit and the pad unit are connected together in a single piece. In particular the handle unit and the pad unit are connected together in a single piece. The handle unit has in particular, when viewed from above, at least in essence a rod-shaped form. In particular the handle unit has a transverse extension in a range from 5 mm to 55 mm, in particular from 10 mm to 50 mm, advantageously from 150 mm to 45 mm, and preferably from 20 mm to 40 mm. In particular the pad unit has a thickness in a range from 2 mm to 35 mm, in particular from 3 mm to 30 mm, advantageously from 4 mm to 25 mm, and preferably from 5 mm to 20 mm. In particular a direction of longitudinal extension of the handle unit and a direction of longitudinal extension of the spacer element are arranged at least in essence perpendicular to each other. In particular the operating unit is arranged at least to a large degree in the handle unit and/or integrated in the handle unit. The pad device could have in particular at least one operating element which could be provided for an input of operating parameters and/or for a selection of operating parameters. The operating element could be realized in particular in a single piece with the handle unit and in particular in the form of a button arranged in the handle unit and/or in the form of a touch-slider arranged in the handle unit. A "handle unit" should be understood to mean in particular a unit which is provided in particular in order to be held and/or touched for the purpose of a movement at least of the pad unit effected by a user. This makes it possible in particular to enable a simple handling of the pad device.

It is furthermore proposed that the electronic unit has a cooking vessel recognition unit which is provided in order to detect in particular cooking vessels set down on the pad unit. In particular the cooking vessel recognition unit is integrated at least to a large degree in the pad unit. For example the cooking vessel recognition unit could have at least one sensor which could be provided in order to detect a cooking vessel set down, in particular on the pad unit, on the basis of a weight force of the cooking vessel. Alternatively or additionally the cooking vessel recognition unit could have at least one acceleration sensor and/or expansion sensor which could be provided in particular in order to detect a deformation of a surface of the pad unit provided for a setting down of the cooking vessel, in particular in a vertical direction. The cooking vessel recognition unit could be provided in particular in order to detect cooking vessels set down in the vertical direction out of the detection of the deformation of the surface, provided for a setting down of the cooking vessel, of the pad unit. The vertical direction is aligned in particular at least in essence perpendicular to the setting-down counter. In particular the vertical direction is aligned at least in essence perpendicular to a substrate. The substrate for example could be a ground and/or a floor. This makes it possible in particular to omit a stovetop cooking vessel recognition unit.

It is furthermore proposed that the pad device has a receiver unit which is provided for receiving energy contactlessly, in particular electromagnetic energy. The receiver unit for example could be realized in the form of a communications unit and in particular have at least one antenna which could be provided for receiving energy contactlessly, in particular electromagnetic energy. In particular the receiver unit realized in the form of a communications unit could have at least one transmitter which could be provided in order to transmit at least one item of information and/or at least one parameter to a third unit, such as for example a control unit. Alternatively or additionally the receiver unit could be realized in the form of an energy unit and in particular have at least one coil which could be provided for receiving energy contactlessly, in particular electromagnetic energy. In particular the receiver unit is integrated at least to a large degree in the pad unit. This makes it possible in particular to achieve a high level of flexibility.

It is additionally proposed that the receiver unit is provided for an energy supply to at least part of the electronic unit. The stovetop has in particular at least one induction unit. An "induction unit" should be understood to mean in particular a unit which is provided in order to supply, in at least one operating mode, in particular at least in the heating operating mode, at least one electromagnetic alternating field for a transmission of energy. The induction unit is provided in particular in order to generate and/or elicit at least one induction current in the receiver unit in at least one operating mode, in particular at least in the heating operating mode, by using the electromagnetic alternating field. The induction unit for example could have at least one energy transmission element realized differently from a heating unit which could be provided in particular in order to make available the energy for the receiver unit in at least one operating mode, in particular at least in the heating operating mode. In particular the energy transmission element could have at least one inductor and/or at least one coil. The energy transmission element could be provided in particular in order to make available the energy for the receiver unit at least by using an inductive energy transmission in at least one operating mode, in particular at least in the heating operating mode. Advantageously the heating unit, in particular of the stovetop, forms part of the induction unit and in particular is realized in the form of an induction heating unit. In particular the heating unit realized in the form of an induction heating unit is provided in order to make available the energy for the receiver unit in at least one operating mode, in particular at least in the heating operating mode. In particular the heating unit is provided in order to heat at least part of the cooking vessel, in particular at least part of a base of the cooking vessel, in at least one operating mode, in particular at least in the heating operating mode, in particular additionally to the supply of energy for the receiver unit. The receiver unit is provided in particular in order to absorb electromagnetic energy advantageously made available by the induction unit in at least one operating mode, in particular at least in the heating operating mode. Preferably the receiver unit is provided in order to supply the electronic unit at least in part, in particular at least to a large degree, and advantageously entirely, by using the absorbed energy. The receiver unit could be provided for example for an inductive energy transmission and/or for a capacitive energy transmission and/or for an electromagnetic energy transmission and/or for an energy transmission by using laser and/or for an energy transmission by using sound and/or for an energy transmission by using Bluetooth and/or for an energy transmission by using Bluetooth Low Energy. This makes it possible in particular to supply an environmentally friendly and/or energy-saving embodiment. In particular the use of accumulators and/or batteries can be omitted. In particular a low-cost and/or simply realized pad device can be enabled. In particular the changing of a battery and/or of an accumulator can be omitted with the result that in particular a high level of convenience for a user can be achieved.

In a further embodiment a cooking system is proposed with at least one stovetop, in particular with at least the stovetop, with at least one inventive pad device, and with a setting-down counter. This makes it possible in particular to enable a particularly flexible embodiment.

For example the setting-down counter could be a stovetop plate and could be provided in particular in order to realize part of an outer casing, in particular of a stovetop. Preferably the setting-down counter is realized in the form of a kitchen countertop that is realized differently from a stovetop plate. In particular the stovetop is arranged at least to a large degree and advantageously entirely below the setting-down counter in a built-in position. This makes it possible in particular to omit a stovetop plate and/or make a space-saving embodiment available.

It is furthermore proposed that the pad unit is provided for a positioning at any required point on the setting-down counter above the stovetop. This makes it possible to position the pad unit in particular in a flexible manner at any required position on the setting-down counter.

It is furthermore proposed that the stovetop has a stovetop control unit which is provided in order to start a heating, in particular of the set-down cooking vessel, only in the presence of a pad unit having been put down, in particular only in the presence of a pad device having been put down. In particular the stovetop control unit is provided for use with various pad units, in particular with various pad devices, with the result that in particular a simple customer-specific adaptation and/or a modular embodiment can be obtained. The stovetop control unit is provided in particular in order to start a heating only in the case of a positioning of the pad unit on the cooking area and in particular additionally only in the case of a setting-down of a cooking vessel on the pad unit. This makes it possible in particular to prevent damage to the setting-down counter, in particular to a surface of the setting-down counter, and/or achieve a durable embodiment, with the result that the setting-down counter can consist in particular at least to a large degree of at least one high-quality material. Signs of aging of the setting-down counter and, associated with this, a replacement of the setting-down counter can be prevented in particular. In particular a high level of safety can be ensured.

The pad device should not be restricted hereby to the application and embodiment described above. In particular the pad device can have, for fulfillment of a mode of functioning described herein, a quantity of individual elements, components, and units differing from a quantity stated herein.

Further advantages are disclosed in the following drawing description. Exemplary embodiments of the invention are shown in the drawing. The drawing, the description and the claims contain numerous features in combination. A person skilled in the art will also suitably consider the features individually and group them into other useful combinations.

DETAILED DESCRIPTION OF EXEMPLARY EMBODIMENTS OF THE PRESENT INVENTION

Figure 1:
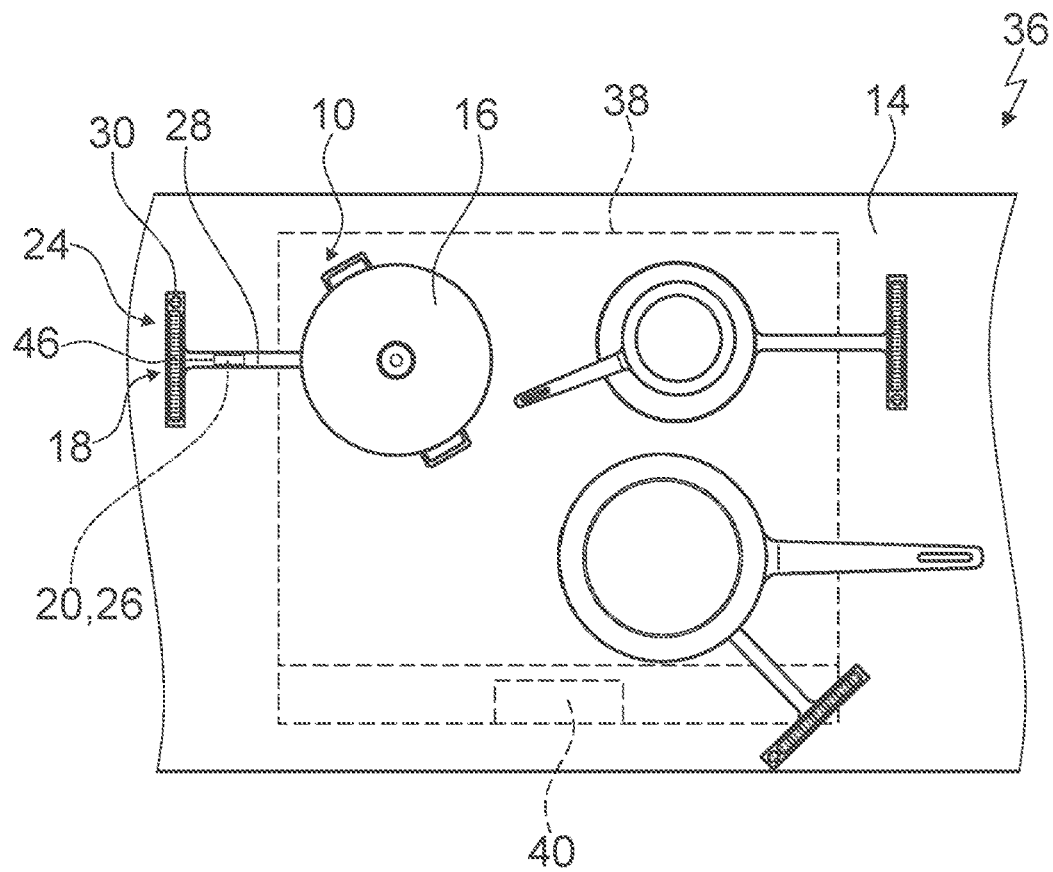
FIG. 1 shows a cooking system with a stovetop, with a countertop, with three pad devices, and three cooking vessels in a schematic plan view.

FIG. 1 shows a cooking system 36 with a stovetop 38 and with three pad devices 10. In respect of objects present in multiple instances only one is labeled with a reference character in the figures in each case. In respect of the pad devices 10 only one is described below.

The cooking system 36 has a setting-down counter 14. In an installed state the stovetop 38 is arranged below the setting-down counter 14. The stovetop 38 is free of any stovetop plate in the present exemplary embodiment. The setting-down counter 14 is realized in the form of a kitchen countertop that is realized differently from a stovetop plate.

The stovetop 38 has multiple heating units (not shown). The heating units are arranged in the form of a matrix. The heating units define a variable cooking area zone. The heating units are realized in the form of induction heating units. A surface zone of the setting-down counter 14, below which the stovetop 38 is arranged, defines a cooking area.

The cooking system 36 has a stovetop control unit 40. In the installed state the stovetop control unit 40 is arranged below the setting-down counter 14. The stovetop control unit 40 regulates an energy feed to the heating units of the stovetop 38 in a heating operating mode.

The setting-down counter 14 is provided for putting down the pad device 10. In a heating operating mode the pad device 10 is arranged in part between the setting-down counter 14 and a heated cooking vessel 16. The pad device 10 has a pad unit 12 (cf. FIGS. 2 to 4). In the heating operating mode the pad unit 12 is arranged to a large degree between the setting-down counter 14 and a heated cooking vessel 16.

In the heating operating mode the pad unit 12 essentially prevents a transfer of heat from the cooking vessel 16 to the setting-down counter 14. The pad unit 12 has an essentially disk-shaped form. In the present exemplary embodiment the pad unit 12 has a diameter 42 of essentially 180 mm (cf. FIG. 3). The pad unit 12 has a thickness 44 of essentially 2 mm.

The pad unit 12 consists to a large degree of an essentially flexible material. The material of which the pad unit 12 consists to a large degree has a low thermal conductivity. In particular the material of which the pad unit consists to a large degree is essentially insulating and/or essentially easy to clean. In the present exemplary embodiment the pad unit 12 consists to a large degree of silicone.

The pad device 10 has an electronic unit 18 (cf. FIGS. 1 to 4). The electronic unit 18 makes a function available in an operating mode. Prior to the start of the heating operating mode the electronic unit 18 makes several functions available in the operating mode.

Figure 2:
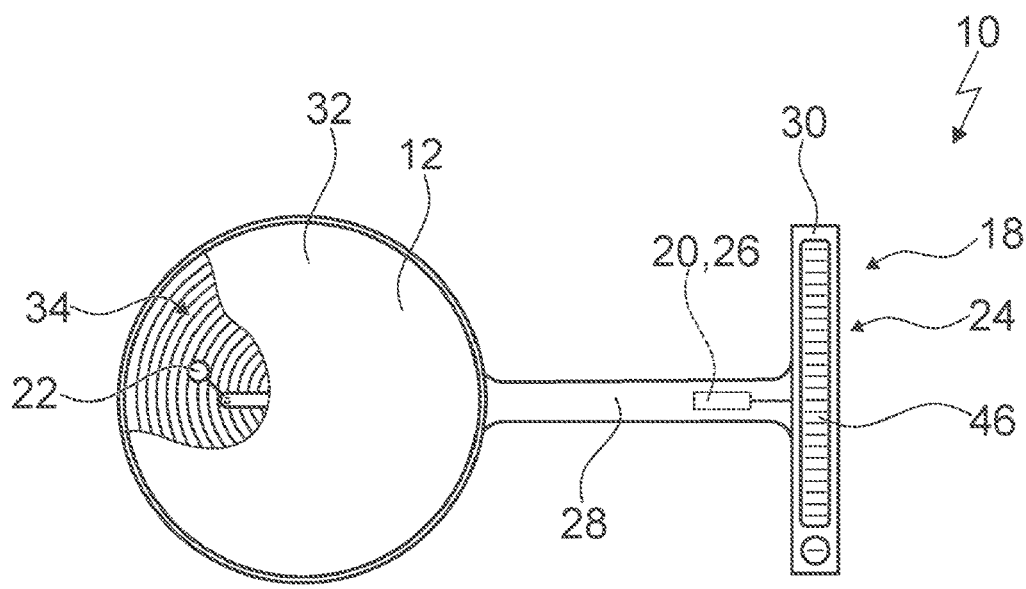
FIG. 2 shows one pad device of the pad devices in a schematic plan view, where part of a pad unit of the pad device is not shown, in order to enable a view into a hollow space of the pad unit.
Figure 4:
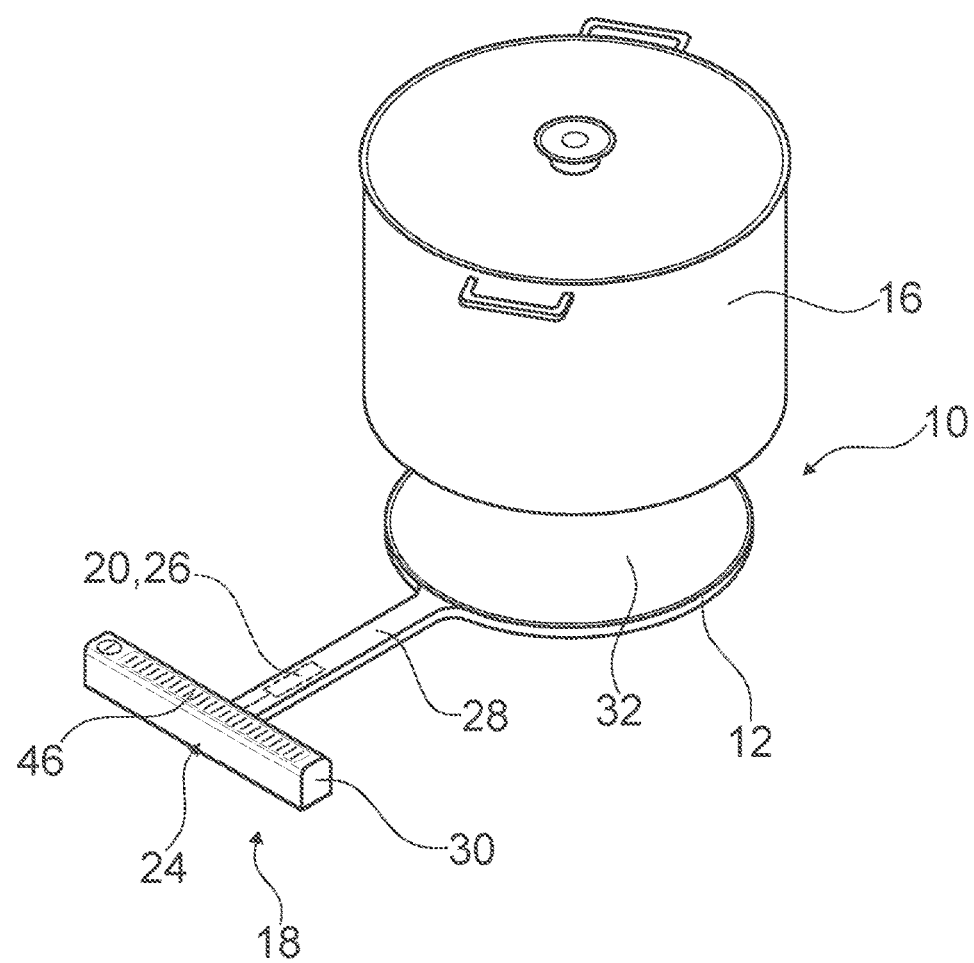
FIG. 4 shows the pad device and one cooking vessel of the cooking vessels in a schematic perspective view.

The electric unit 18 has a positioning unit 20 (cf. FIGS. 1, 2, and 4). The positioning unit 20 essentially detects a position of the pad unit 12 on the setting-down counter 14. In the present exemplary embodiment the positioning unit 20 has an acceleration sensor (not shown). The acceleration sensor is calibrated to the dimensions of the stovetop 38.

In the present exemplary embodiment the positioning unit 20 is realized partly in a single piece with a control unit 26 of the electronic unit 18. The electronic unit 18 has the control unit 26. The control unit 26 controls the stovetop control unit 40 in the operating mode and in the heating operating mode.

The electronic unit 18 has a cooking vessel recognition unit 32 (cf. FIGS. 1, 2, and 4). The cooking vessel recognition unit 32 is realized partly in a single piece with the pad unit 12 in the present exemplary embodiment. In the operating mode the cooking vessel recognition unit 32 detects cooking vessels 16 set down on the pad unit 12. In the operating mode the cooking vessel recognition unit 32 detects a deformation of a surface of the pad unit 12 provided for setting-down the cooking vessel 16.

The pad unit 12 is provided for a positioning at any required point on the setting-down counter 14 above the stovetop 38. The electronic unit 18 outputs a warning signal to a user in the event of an incorrect positioning of the pad unit 12. Depending on an activation by the control unit 26, the stovetop control unit 40 starts a heating of the set-down cooking vessel 16 only in the case of a pad unit 12 having been put down. The start of heating of the set-down cooking vessel 16 results in the stovetop control unit 40 starting the heating operating mode.

The electronic unit 18 has a temperature sensor 22 (cf. FIG. 2). The temperature sensor 22 is arranged to a large degree inside the pad unit 12. In the heating operating mode the temperature sensor 22 detects a temperature of the cooking vessel 16. In the heating operating mode and in the operating mode the electronic unit 18 makes several functions available.

The electronic unit 18 has an operating unit 24 (cf. FIGS. 1, 2, and 4). In the operating mode the operating unit 24 is provided for a user input of operating parameters. The pad device 10 has an operating element 46 for an input of operating parameters. The operating element 46 is realized in the form of a touch-slider.

The control unit 26 controls and/or regulates a cooking process taking place in the cooking vessel 16 in the heating operating mode depending on the operating input. In the present exemplary embodiment the control unit 26 is arranged to a large degree inside a spacer element 28 (cf. FIGS. 1 to 4).

The pad device 10 has the spacer element 28 (cf. FIGS. 1 to 4). The spacer element 28 is connected in a single piece to the pad unit 12. The spacer element 28 spaces the operating unit 24 away from the pad unit 12. In the present exemplary embodiment the spacer element 28 has a longitudinal extension 48 of essentially 150 mm. A thickness of the spacer element 28 corresponds essentially to the thickness 44 of the pad unit 12. The operating unit 24 is arranged at one end of the spacer element 28, which faces away from the pad unit 12.

A handle unit 30 is arranged at the end of the spacer element 28 facing away from the pad unit 12. The pad device 10 has the handle unit 30 (cf. FIGS. 1 to 4). The operating unit 24 is arranged to a large degree inside the handle unit 30. The handle unit 30 is connected in a single piece to the spacer element 28. By way of the spacer element 28 the handle unit 30 is connected in a single piece to the pad unit 12.

Figure 3:
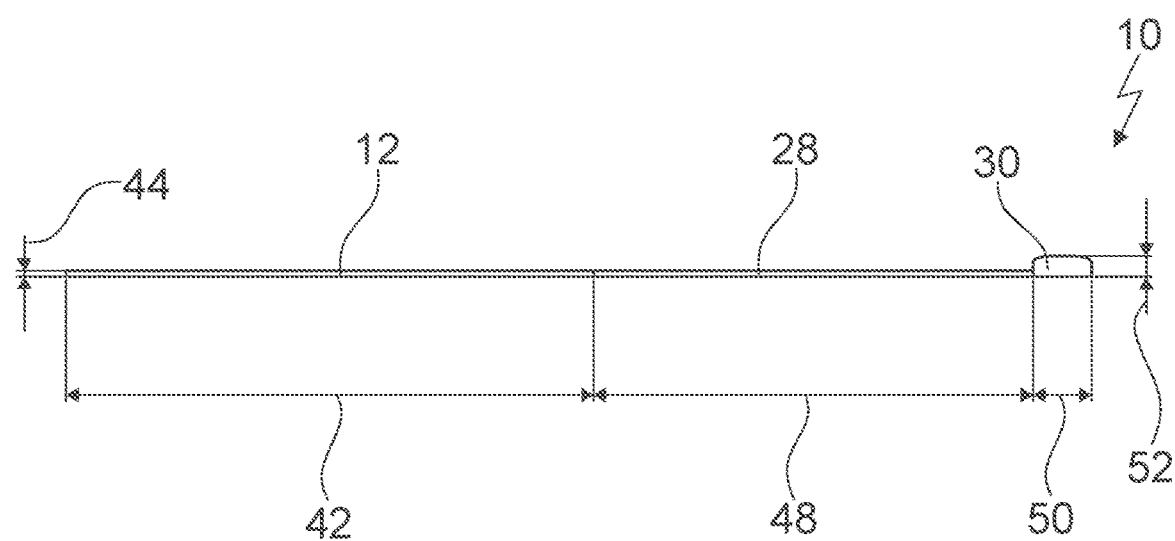
FIG. 3 shows the pad device in a schematic side-view.

In the present exemplary embodiment the handle unit 30 has a transverse extension 50 of essentially 20 mm (cf. FIG. 3). The handle unit 30 has a thickness 52 of essentially 7 mm.

The pad device 10 has a receiver unit 34 (cf. FIG. 2). The receiver unit 34 is provided for receiving energy contactlessly. In the operating mode the receiver unit 34 receives energy contactlessly from the stovetop 38.

The receiver unit 34 receives energy contactlessly from the heating units in the heating operating mode. In the operating mode the receiver unit 34 receives energy contactlessly from an energy transmission element (not shown) of an induction unit (not shown) of the stovetop 38. The receiver unit 34 has a coil for receiving energy contactlessly.

The receiver unit 34 essentially supplies the electronic unit 18 with the received energy. The receiver unit 34 is provided for supplying energy to the electronic unit 18.

The invention claimed is:

1. A pad device, comprising:
a pad comprising a thermally insulating material, wherein the pad is configured to be placed least in part between a setting-down counter and a heated cooking vessel; and
a spacer element coupled at a first end to the pad and at a second end to a transverse handle; and
an electronic unit integrated into the pad device and configured to supply at least one function to the pad device,
wherein the electronic unit includes a positioning unit configured to detect a position of the pad on the setting-down counter.

2. The pad device of claim 1, wherein the pad is configured to prevent a transfer of heat from the heated cooking vessel to the setting-down counter.

3. The pad device of claim 1, wherein the pad comprises a flexible material.

4. The pad device of claim 1, wherein the electronic unit includes a temperature sensor configured to detect a temperature of the heated cooking vessel.

5. The pad device of claim 1, wherein the electronic unit includes an operating unit configured to receive and process an input of an operating parameter.

6. The pad device of claim 5, wherein the electronic unit includes a control unit configured to control a cooking process by activating at least one heating unit of a stovetop in response to the input of the operating parameter into the operating unit.

7. The pad device of claim 5, a wherein the operating unit is housed at least in part in the handle of the pad device.

8. The pad device of claim 1, wherein the electronic unit includes a cooking vessel recognition unit configured to detect a cooking vessel placed on the pad by detecting a weight of the cooking vessel.

9. The pad device of claim 1, further comprising a receiver unit integrated, at least in part, into the pad, such that when the device is placed on a stovetop, the receiver unit is configured to receive energy contactlessly from the stovetop.

10. The pad device of claim 9, wherein the receiver unit is further configured to supply the energy received from the stovetop to the electronic unit.

11. A cooking system, comprising:
a stovetop;
a setting-down counter; and
a pad device including a pad comprising a thermally insulating material, and a transverse handle coupled to the pad by a spacer element;
wherein the pad device includes an electronic unit integrated into the pad device and configured to supply at least one function to the pad device, and
the electronic unit includes a cooking vessel recognition unit configured to detect a cooking vessel placed on the pad by detecting a weight of the cooking vessel.

12. The cooking system of claim 11, wherein the setting-down counter is a kitchen countertop having a configuration that is different than a configuration of a stovetop plate.

13. The cooking system of claim 11, wherein the pad is adapted to be positioned at any point on the setting-down counter above the stovetop.

14. The cooking system of claim 11, wherein the pad is configured to prevent a transfer of heat from the heated cooking vessel to the setting-down counter.

15. The cooking system of claim 11, wherein the pad comprises a flexible material.

16. The cooking system of claim 11, wherein the electronic unit includes a positioning unit configured to detect a position of the pad on the setting-down counter.

17. The cooking system of claim 11, wherein the electronic unit includes a temperature sensor configured to detect a temperature of the heated cooking vessel.

18. The cooking system of claim 11, wherein the electronic unit includes an operating unit configured to receive and process an input of an operating parameter.

19. The cooking system of claim 18, wherein the electronic unit includes a control unit configured to control a cooking process activating a heating unit of the stovetop in response to the input of the operating parameter in the operating unit.

20. The cooking system of claim 18, wherein the operating unit is housed, at least in part, in the handle.

21. The cooking system of claim 11, wherein the pad device further includes a receiver unit integrated, at least in part, in the pad, such that the receiver unit is configured to receive energy contactlessly from the stovetop.

22. The cooking system of claim 21, wherein the receiver unit is further configured to supply the energy received from the stovetop to the electronic unit.

* * * * *